(12) United States Patent
Nordback

(10) Patent No.: US 9,323,492 B2
(45) Date of Patent: Apr. 26, 2016

(54) SYSTEMS AND METHODS FOR ENHANCED PRINTING OF ONLINE CONTENT

(71) Applicant: Konica Minolta Laboratory U.S.A., Inc., San Mateo, CA (US)

(72) Inventor: Kurt Nathan Nordback, Portland, OR (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 14/812,787

(22) Filed: Jul. 29, 2015

(65) Prior Publication Data

US 2015/0331647 A1 Nov. 19, 2015

Related U.S. Application Data

(63) Continuation of application No. 12/571,131, filed on Sep. 30, 2009, now abandoned.

(51) Int. Cl.
*G06K 15/00* (2006.01)
*G06F 3/12* (2006.01)

(52) U.S. Cl.
CPC ............ *G06F 3/1272* (2013.01); *G06F 3/1285* (2013.01); *G06F 3/1265* (2013.01); *G06F 3/1288* (2013.01); *H04N 2201/33328* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,628,417 B1* | 9/2003 | Naito | ................ | G06F 3/1208 358/1.15 |
| 6,633,890 B1* | 10/2003 | Laverty | ................ | G06F 3/1208 358/1.15 |
| 6,674,539 B1* | 1/2004 | Serra | ................ | G06F 3/1208 358/1.15 |
| 2002/0093681 A1* | 7/2002 | Hitaka | ................ | G06F 3/1205 358/1.15 |
| 2002/0118389 A1* | 8/2002 | Fukuda | ............... | H04L 67/1008 358/1.15 |
| 2006/0221208 A1* | 10/2006 | Minami | ............. | H04N 1/00453 348/231.2 |
| 2010/0238483 A1* | 9/2010 | Nelson | ................ | G06F 3/1204 358/1.15 |
| 2014/0132975 A1* | 5/2014 | Song | ................ | G06F 3/1204 358/1.15 |

* cited by examiner

*Primary Examiner* — Richard Zhu
(74) *Attorney, Agent, or Firm* — Osha Liang LLP

(57) ABSTRACT

Methods disclosed permit the printing of online content in a manner that optimally uses printer capability. A method for printing web page content can comprise: receiving a print request for a first print data associated with the web page at a printer, wherein the print request includes the web-page URL; generating a request for a second print data, wherein the request for the second print data is based on the web-page URL, and the second print data is associated with the first print data; and printing according to the second print data received in response to the request. For example, for online maps, the first print data can be low resolution map data while the second print data can be higher resolution map data. For online images, the first print data can be RGB image data while the second print data can be CMYK image data.

19 Claims, 4 Drawing Sheets

SYSTEMS AND METHODS FOR ENHANCED PRINTING OF ONLINE CONTENT

CROSS-REFERENCE TO RELATED APPLICATIONS

The present application is a continuation of, and therefore claims benefit under U.S.C. §120 to U.S. patent application Ser. No. 12/571,131, filed Sep. 30, 2009, the contents of which are hereby incorporated by reference in their entirety.

BACKGROUND

1. Field of the Invention

The present invention relates to the field of printing and in particular, to systems and methods to enhance the printing of online content by printers through techniques that facilitate optimal usage of printer capabilities.

2. Description of Related Art

Computer printers, which are ubiquitous in most modern organizations, permit the quick printing of stored documents. Designers of modern printers have focused relentlessly on improving printer speed, efficiency, color accuracy, and cost resulting in virtually universal adoption of printers. Thus, even many low cost printers are capable of printing data at relatively high resolutions. For example, many printers are capable of printing at resolutions of 600 dots per inch ("dpi") or at even higher resolutions.

However, for a variety of reasons, many applications do not make optimal use of printer capability. For example, Internet-based map services such as Google™ Maps (maps.google.com) or Yahoo™ Maps (maps.yahoo.com) allow users to rapidly generate and view a map of almost any location in the world at a variety of scales while overlaying a variety of data layers. The resulting maps are of adequate quality for viewing on a computer monitor. On a computer monitor, subject to the limits of map source data users can zoom in on features of interest, so the limited resolution (typically 72 dots per inch) of the monitor does not significantly impede map usability. However, when the map is printed the hard copy produced by the printer is the same resolution as monitor data and is far below the 600 dpi that a typical printer can produce, and far below what users typically expect from printed output. Consequently, printed copies of online maps are of typically of poor quality relative to normal paper maps. Because of the low resolution of the printed online map, small fonts can be difficult to read and geographic detail is difficult to resolve.

Although map data is available at high resolution, map servers typically use a Vector Markup Language ("VML") or other such vector description to store map data. VML is typically not supported by web browsers. Therefore, map servers typically service user map requests by generating map data with a non-VML raster-based format and at a lower resolution supported by a large number of browsers and monitor screens. Further, serving map data at lower resolution requires lower network bandwidth allowing servers to service a greater number of user requests. Moreover, only a fraction of map request users may want to print the maps, so serving high resolution maps may not be the best use of resources. In addition, map services may want to limit release of valuable vector map data, which may be susceptible to theft, if delivered in vector format to users.

In general, because of the differences between monitor and printer capabilities, information security concerns, network bandwidth issues, and/or browser capabilities, online services may not be making use of printer resources in an optimal manner. Therefore, there is a need for systems and methods to allow online services to optimally use printer capabilities in a manner, which: addresses information security concerns of the service providers; has limited impact on network bandwidth; and permits the service provider to continue supporting a variety of browsers.

SUMMARY

Consistent with embodiments disclosed herein, systems and methods for printing online documents in a manner that optimizes use of printer capabilities are presented. In some embodiments, a method for printing data associated with a web page comprises the steps of: receiving a print request for a first print data associated with the web page, wherein the print request includes the URL of the web page; generating a request for a second print data, wherein the request for the second print data is based on the URL of the web page, and the second print data is associated with the first print data; and printing according to the second print data received in response to the request for the second print data.

Embodiments also relate to software, firmware, and program instructions created, stored, accessed, or modified by processors using computer-readable media or computer-readable memory. The methods described may be performed on a computer, print controller, and/or a printing device.

These and other embodiments are further explained below with respect to the following figures.

DETAILED DESCRIPTION

In accordance with embodiments disclosed herein, systems and methods to permit online services to optimally use printer capabilities are presented.

Figure 1:
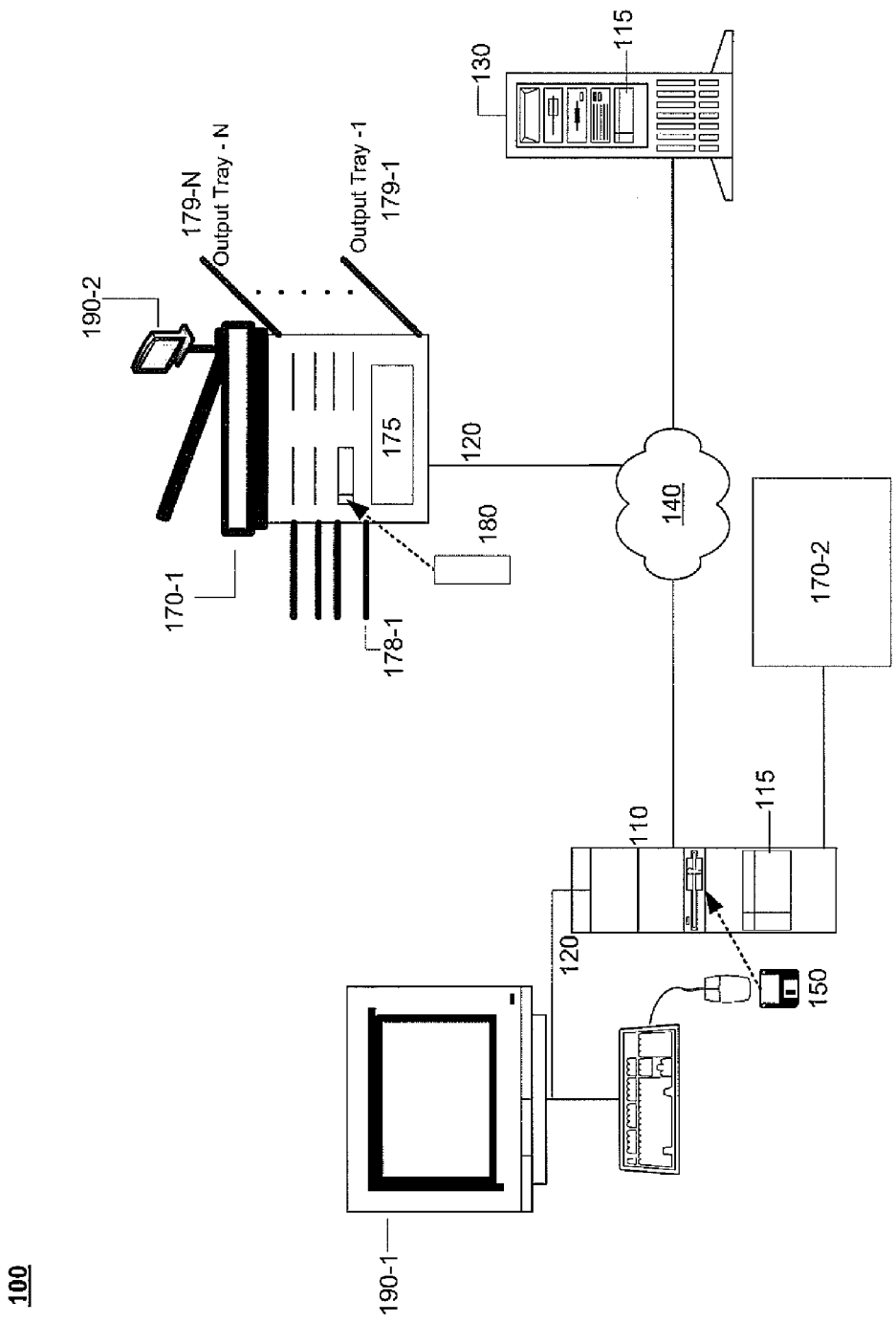
FIG. 1 shows a block diagram of an exemplary system for printing online documents consistent with disclosed embodiments.

FIG. 1 shows a block diagram of exemplary system 100 for printing documents consistent with disclosed embodiments. A computer software application to enhance the printing of online data and/or documents may be deployed on a network of computers and/or printers, as shown in FIG. 1, that are connected through communication links that allow information to be exchanged using conventional communication protocols and/or data port interfaces.

As shown in FIG. 1, exemplary system 100 includes a computer or computing device 110 and a server 130. Further, computing device 110 and server 130 may communicate over a connection 120, which may pass through one or more networks 140, which could include the Internet. Networks 140 may include subnets, LANs, and/or WANs. Further, network 140 may also include modems, routers, repeaters, and other communication devices (not shown) that permit devices that are coupled to a network 140 to communicate with other devices. For example, as shown in FIG. 1, printers 170-1 and other printers and peripherals (not shown) may be capable of communicating with each other and with other devices coupled to network 140.

Computing device 110 may be a computer workstation, desktop computer, laptop computer, or any other computing device capable of being used in a networked environment. Server 130 may be a platform capable of connecting to computing device 110 and other devices too (not shown). Computing device 110 and server 130 may include processors that are capable of executing a variety of software applications, such as web browsers, device drivers, and software to communicate with servers 130 and/or printers 170 to permit optimal use of printer capabilities. In one embodiment, server 130 may run applications such as a map server application that serves maps over the Internet in response to user requests. In another embodiment, server 130 may run an image server application that serves images over the Internet in response to user requests. In one embodiment, server 130 may provide an online service to permit the printing of photographs or images stored on server 130 to printer 170 over the Internet. In some embodiments, server 130 may respond to user requests sent using a web browser such as Firefox™, Netscape™, Safari™, Chrome™, Internet Explorer™ and other browser applications.

Printer 170 may be a laser printer, an ink jet printer, an LED printer, a plotter, and of various other types. From a functional perspective, printers 170 may take the form of computer printers, facsimile machines, digital copiers, multi-function devices, and/or various other devices that are capable of printing documents. Computing device 110 and server 130 may contain secondary storage 115, which may include removable media accessed using removable media drive 150. Secondary storage 115 may include one or more hard disks, fixed flash memory, and/or other non-volatile memory. Removable media drive 150 may include, for example, 3.5 inch floppy drives, CD-ROM drives, DVD ROM drives, CD±RW or DVD±RW drives, USB™ flash drives, Memory Sticks™, Secure Digital High Capacity ("SDHC") cards, and/or any other removable media drives consistent with disclosed embodiments. Portions of software applications for optimal printing may reside on removable media and be read and executed by computing device 110 using removable media drive 150.

Connection 120 couples computing device 110, server 130, and printers 170-1-170-2 to network 140. Connection 120 may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB™, SCSI, FIREWIRE™, serial, parallel, and/or BNC ports for transmission of data through the appropriate connection 120. The communication links could be wireless links or wired links or any combination that allows communication between computing device 110, server 130, and printers 170.

Networks 140 could include a LAN, a WAN, or the Internet. Printers 170, such as exemplary printer 170-1, may be network printers that can be coupled to network 140 through connection 120. System 100 may include multiple printers 170 and other peripherals (not shown). In some embodiments, computer 110, server 130, and printer 170 may communicate over network 140 using encryption schemes such as the Advanced Encryption Standard ("AES") and various other well-known encryption schemes.

Printers 170 may be controlled by processors and other hardware, firmware, or software. Printers 170 may include one or more print controller boards 175, which may control the operation of printers 170 and may also perform portions of configuration and optimization of print functions. Printers 170 may be controlled by firmware or software resident on memory devices in print controller 175. In general, print controller 175 may be internal or external to printers 170. In some embodiments, printers 170 may also be controlled in part by software, including print servers, printer drivers, or other software, running on computing device 110 or server 120.

Printers, such as exemplary printer 170-1, may also include console 190 such as consoles 190-2, or other interfaces to allow various configuration options to be set, print jobs to be selected for printing, passwords and/or user identification and authentication information to be entered, and other messages to be displayed. In some embodiments, configuration options may be set or displayed using a display or user interface on a monitor for a computer coupled to printers 170. For example, user interfaces to set one or more configuration options on printer 170-2 may be displayed on console 190-1.

Users may also be able to log in to a printer 170 to perform administrative functions such as to enable software or firmware on printer 170 to perform various functions. In some embodiments, the log-in process may require a password or other user-authentication mechanism. A user may also be able to specify input trays 178 and/or output trays 179 and the use of automatic document feeders to allow batch processing of documents. Printers 170 may have multiple input trays 178 and/or output trays 179. Output trays 179 can hold printed documents that have been processed by a printer.

A computer software application to optimize the printing of online data and/or documents on printers 170 may be deployed on any of the exemplary computers 110, server 130, and/or printers 170 shown in FIG. 1. For example, computing device 110 could execute software that interacts with software on server 130 to print documents on printer 170-1 in a manner that optimally uses the capabilities of printer 170. As another example, some combination of hardware, software, and/or firmware on printer 170 may permit printer 170 to communicate with server 130 to optimally use printing capability of printer 170 to print documents that use data downloaded from server 130 over network 140. In a further example, an application resident on print controller 175 could be configured to download data from server 130 and permit documents using the data to be printed on printer 170 in a manner that uses printer capabilities optimally. In general, applications may execute in whole or in part on one or more computers, servers, print controllers, or printers in system 100. The embodiments described above are exemplary only and other embodiments and implementations will be apparent to one of ordinary skill in the art.

Figure 1A:
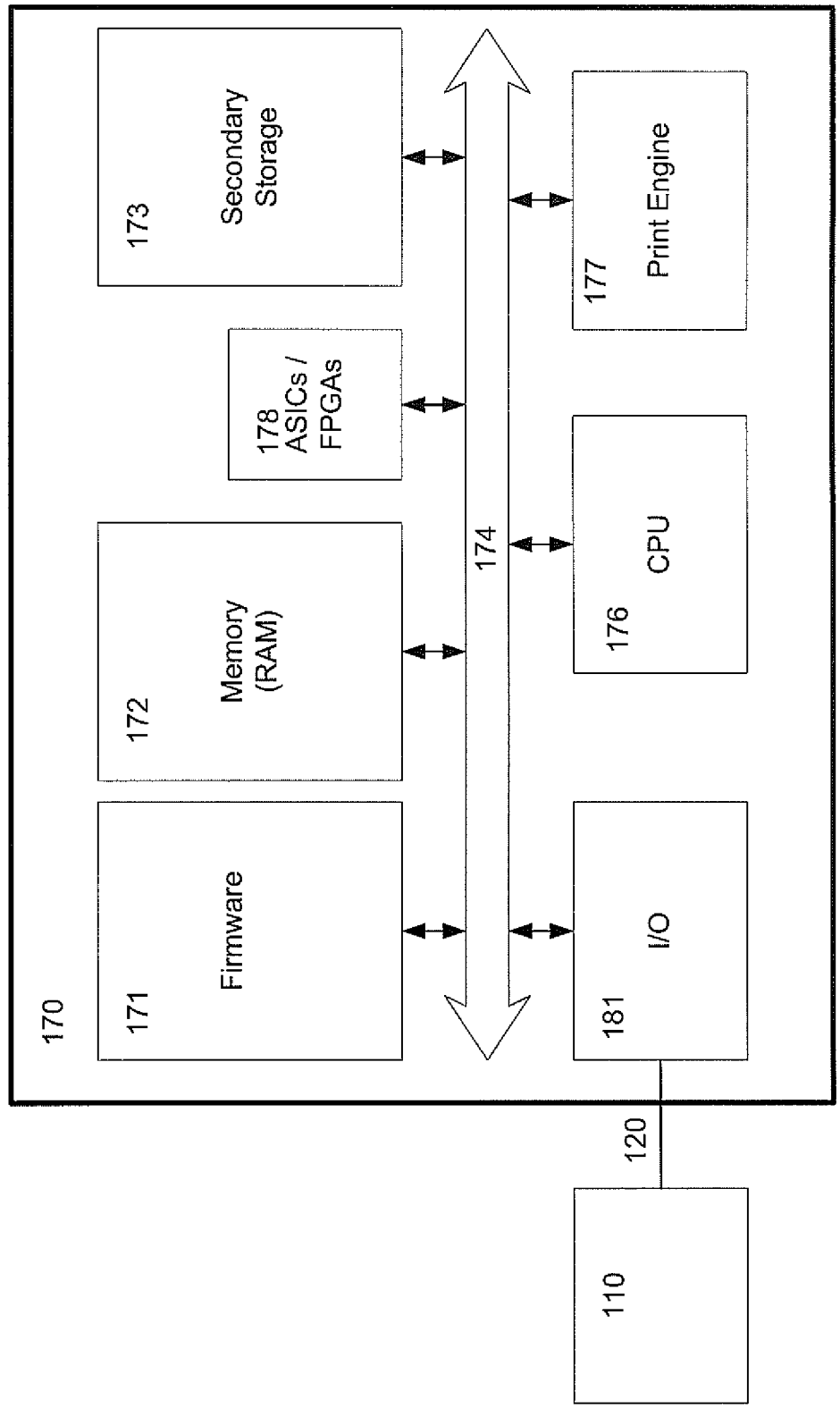
FIG. 1A shows a high-level block diagram of an exemplary printer coupled to a computing device.

FIG. 1A shows a high-level block diagram of exemplary printer 170 coupled to a computing device 110 over connection 120. Exemplary printer 170 may contain bus 174 that couples CPU 176, firmware 171, memory 172, input-output ports 181, print engine 177, and secondary storage device 173. Exemplary printer 170 may also contain other Application Specific Integrated Circuits (ASICs), and/or Field Programmable Gate Arrays (FPGAs) 178 that are capable of executing portions of an application that permits optimal use of the capabilities of printer 170 when printing online documents. Exemplary printer 170 may also be able to access network storage devices over network 140, communicate with applications running on computer 110 or server 130, as well as access secondary storage or other memory in computing device 110 using I/O ports 181 and connection 120. In some embodiments, printer 170 may also be capable of executing software including a printer operating system, software to process VML data, encryption/decryption software, and other appropriate application software.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines to process Printer Description Language ("PDL") data, routines to process VML data, routines to convert VML data to other printable data forms, encryption/decryption routines, configuration management, document processing, and other code. In some embodiments, code and data in firmware 171 may be copied to memory 172 prior to being acted upon by CPU 176. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of configuration management, folder monitoring, and other print related algorithms. CPU 176 may be capable of encrypting and decrypting data, and communicating with software applications running on computer 110 and/or server 130.

Intermediate and final printable data, messages, and configuration information pertaining to one or more printers 170 may be stored in memory 172 or secondary storage 173. Exemplary secondary storage 173 may be an internal or external hard disk, or a memory stick, USB™ drive, SDHC™ card, flash drive, or any other memory storage device capable of being used by system 200. In some embodiments, memory 172 or secondary storage 173 may hold information to establish printer 170 as a trusted client of a service provided by server 130.

Figure 2:
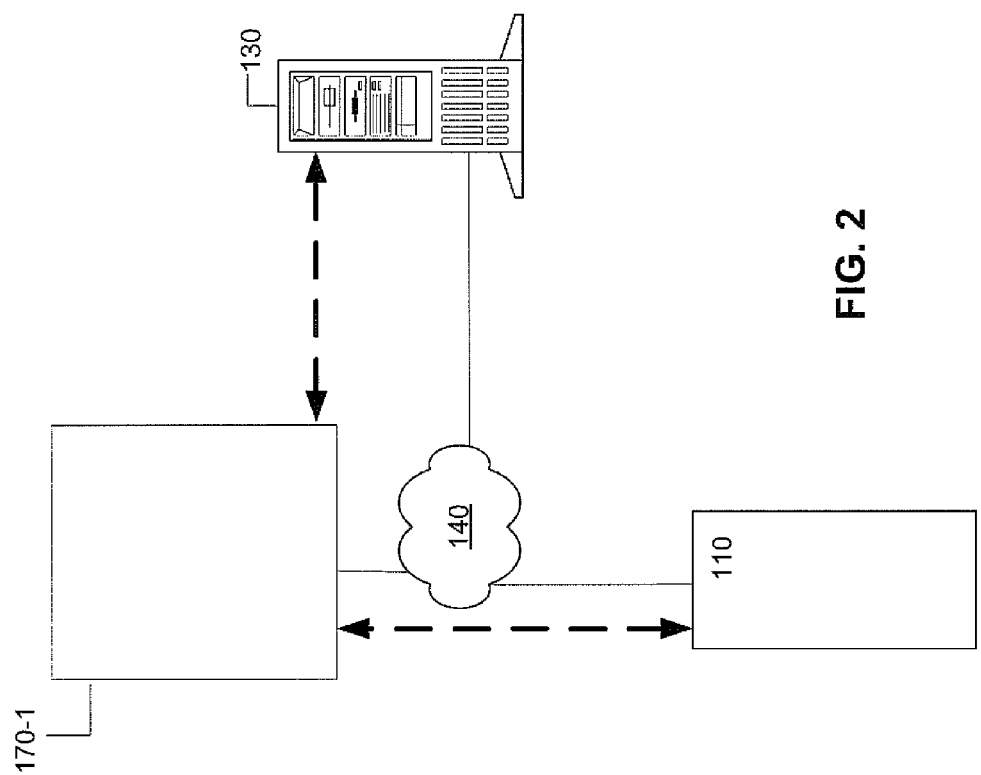
FIG. 2 shows an exemplary system for permitting the printing of online documents in a manner that permits optimal use of the capabilities of a printer.

FIG. 2 shows exemplary system 200 for permitting the printing of online documents in a manner that permits optimal use of the capabilities of printer 170. System 200 may include various other components that have not been shown to simplify description. In some embodiments, computer 110 may request a service from server 130 over network 140. In response to the request, an application server program that delivers the service and runs on server 130 may send data to computer 110. For example, a user on computer 110 may use a browser to invoke a map service provided by application server software (such as a map server application) running on server 130. In response to the request, map data may be sent to computer 110 for display on a monitor such as monitor 190-1 through a web browser interface.

At some point, a user of computer 110 may invoke a print function, such as a "Print" option on the browser in order to print the current web-page on printer 170-1. For example, the user may request printing of the map of some location, or driving directions from one place to another. In some embodiments, upon invocation of the print request, browser may commence generating PIM output for printing. In one embodiment, browser may also send the URL of the web-page to be printed to printer 170-1 either separately or as part of the PDL data. In some embodiments, printer 170-1 may parse the PDL data to determine and extract the URL of the page being printed. Further, printer 170 may then use the URL to request alternate data from the software application running on server 130 that is more suited to optimally utilize print capabilities of the printer.

For example, printer 170-1 may use the received or extracted URL to request higher-resolution VML map data from the map server running on server 130. In one embodiment, printer 170-1 may request VML data using a pre-determined and/or agreed upon protocol. In another embodiment, printer 170-1 may use a pre-defined (and agreed upon) variation of the URL used by the browser to request the VML data. In some embodiments, printer 170-1 may also include hardware, software or firmware to process VML data.

In some embodiments, printer 170-1 may identify itself as a trusted client or consumer to the application server software running on server 130. For example, printer 170-1 may digitally sign requests to the application server software running on server 130 to identify itself as a trusted client. The digital signature could be common to a given model of printer, or to a given printer company, or for greater security could be unique to each individual printer, or could be sent to printer 170 using a prearranged protocol when the user signs up for a service provided through server 130. The dashed arrows in FIG. 2 indicate that data flow can occur between computer 110 and printer 170-1. For example, computer 110 can send a first data, which can comprise PDL data, and also send the URL of the web-page to be printed to printer 170-1. Data can also flow between printer 170-1 and server 130. For example, printer 170-1 may send a request for second data associated with the first data (such as data in an alternate format or at a different resolution from the first data) to server 130 and server 130 may respond to the request with the second data.

In the map server example, in response to the request for higher resolution data from printer 170-1, the map server may send printer 170-1 higher resolution VML or other vector format map data. In some embodiments, the data may be sent after verification of the digital signature provided by printer 170-1. In some embodiments, the higher resolution map data may be encrypted prior to transmission. Upon receiving the higher resolution map data, printer 170-1 may decrypt and process the VML data to print a high resolution map. In some embodiments, printer 170-1 may discard the PDL data received from the browser after receiving the alternate data. If no data is received from server 130 in response to the request, then printer 170-1 may print the map using the PDL data.

It should be noted that the printing of high resolution maps represents only one possible application of the method disclosed and various other applications are contemplated. In general, in response to a print request with a first print data, printer 170-1 may request alternate or second print data from an application running on server 130 using network 140. The second print data may be better suited for printing in accordance with the capabilities of printer 170-1. In some embodiments, a user may directly enter a URL for the data to be printed by using a console such as console 190-2 coupled to printer 170-1. In some embodiments, the user may also directly enter a URL to permit printer 170-1 to obtain the second print data by using a configuration interface for printer 170-1. For example, a GUI or a configuration web-page for printer 170-1, such as an interface displayed on monitor 190-1, may be used to enter the URL. Printer 170 may then process the URL in the manner recited above to obtain data from server 130 that makes more optimal use of its capabilities.

As another example, an image server application running on server 130 may serve images to a browser running on computer 110. Because the images are typically displayed in a Red-Green-Blue ("RGB") format on monitors, image server may send RGB images to the browser for display on monitor 190-1. When the user requests the printing of an image, printer may use the URL for the web-page corresponding to the image to request a Cyan-Magenta-Yellow-Black ("CMYK") equivalent of the RGB image for printing. In other words, the request for the CMYK equivalent of the RGB image may be based, in part, on the URL of the web page associated with the RGB image. Printers typically use the CMYK color space to process and render images. However, in addition to the time taken to convert images from RGB to CMYK, some color accuracy may be lost during the conversion process. If server 130 has both RGB and CMYK images then an image server may be able to serve RGB images to users for viewing and to allow users to select images for printing and then, in response to the printer's request, send the printer the selected CMYK images for printing using the methods disclosed.

As a further example, when browser 360 displays a web-page, data sent to browser 360 may use fonts supported by browser 360. When the user requests printing of displayed content for the web page, printer 170-1 may request alternate data from the web-page with fonts supported by printer 170-1. The request may be based, in part, on the URL of the web-page. Alternate print data with fonts supported by printer 170-1 may be sent to printer 170-1 by server 130. Printer 170-1 may print the content associated with the web-page according to the received alternate print data.

Figure 3:
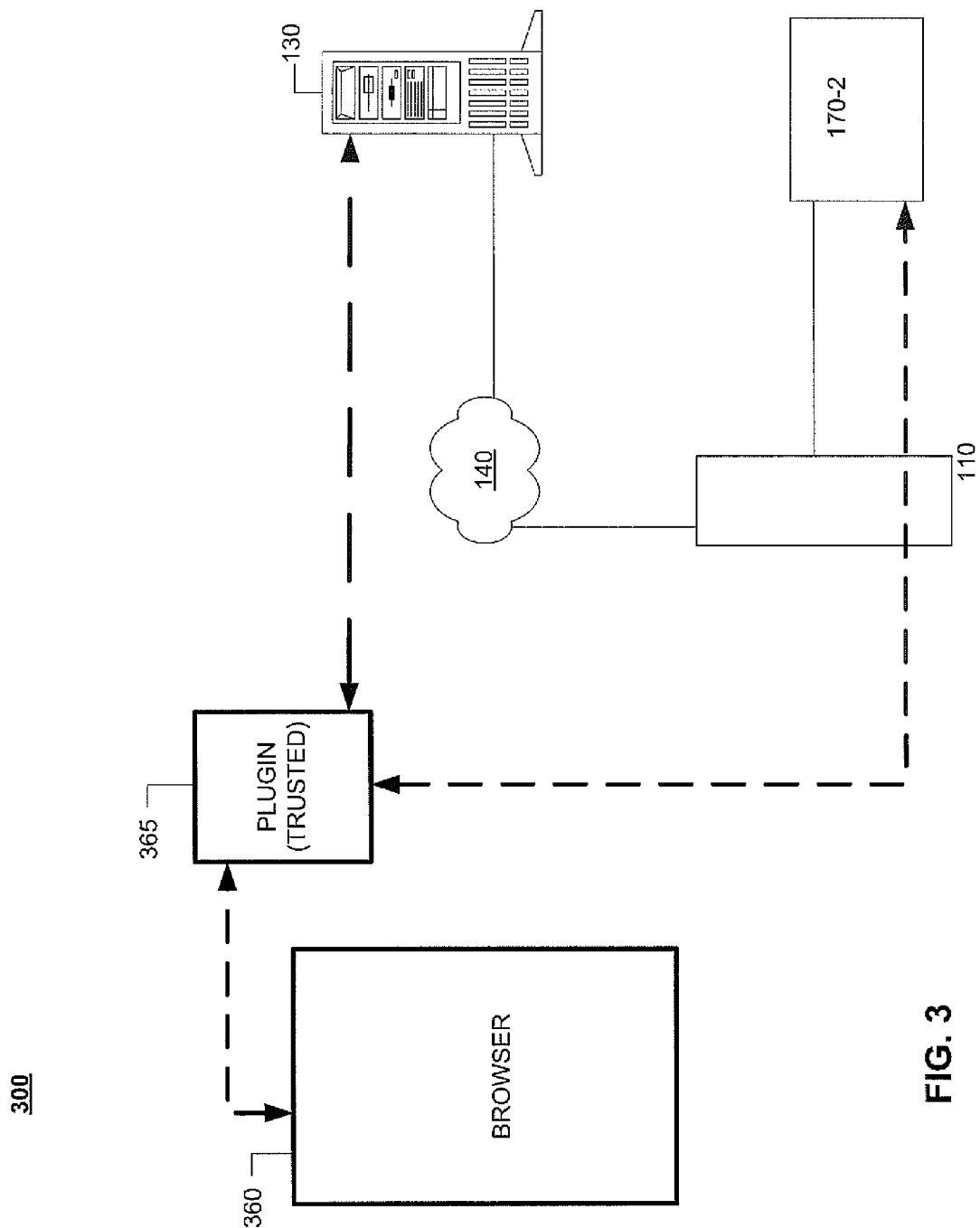
FIG. 3 shows another exemplary system for permitting the printing of online documents in a manner that permits optimal use of the capabilities of a printer.

FIG. 3 shows an exemplary system 300 for permitting the printing of online documents in a manner that permits optimal use of the capabilities of printer 170. System 300 may include various other components that have not been shown to simplify description. In some embodiments, computer 110 may request a service from server 130 over network 140. In response to the request, application server software running on server 130 may send data to computer 110. For example, a user on computer 110 may use browser 360 to invoke a map service provided by an application server (such as a map server) running on server 130. In response to the request, map data may be sent to computer 110 for display on a monitor such monitor 190-1 through web browser 360.

At some point, a user of computer 110 may invoke a print function, such as a "Print" option on browser 360 to print the current web-page on printer 170-2. For example, the user may request printing of the map of some location, or driving directions from one place to another. When the user invokes a print function, plug-in 365 on the browser may be invoked. In some embodiments, browser 360 may have several plug-ins 365 for various applications. For example, if a map is being printed a "Print Map" plug-in may be invoked. On the other hand, if an image is being printed then a "PrintCMYK" plug-in may be invoked.

In some embodiments, plug-in 365 may send a special control command to the server that can be based on the full URL of the current map view. In one embodiment, plug-in 365 may request alternate data from the application running on server 130 using an agreed upon protocol. In another embodiment, plug-in 365 may use a pre-defined variation of the URL used by the browser to request the alternate data. In some embodiments, plug-in 365 may send the URL to printer 170-2, and printer 170-2 may request alternate data from the application server running on sewer 130 as described above with respect to FIG. 2. In general, the upstream request from plug-in 365 can specify the data and format requested. The format requested may vary depending on the plug-in application, the services provided by the application server on server 130, and the capabilities of printer 170-2.

In some embodiments, plug-in 365 may identify itself as a trusted client or consumer to the software application running on server 130. For example, plug-in 365 may digitally sign requests to the software application running on server 130 to identify itself as a trusted client. The digital signature could be common to a given model of printer, or to a given printer company, or for greater security could be unique to each individual printer, or could be sent to plug-in 365 using a prearranged protocol when the user signs up for a service provided through server 130 and/or downloads appropriate plug-in 365. In some embodiments, plug-in 365 may send the data to printer 170-2 using computer 110. The dashed arrows in FIG. 2 indicate that data flow can occur between the browser 360 to plug-in 365. For example, the data flow may occur when plug-in 365 is invoked. In addition, communication may also occur between plug-in 365 and server 130. For example, plug-in 365 may request alternate data from server 130 and server 130 may respond to the request. Further, plug-in 365 and printer 170-2 may communicate. For example, plug-in 365 may send the alternate data received from server 130 to printer 170-2 for printing.

In the map server example, in response to the request for higher resolution data from plug-in 365, the map server may send plug-in 365 higher resolution VML map data. In some embodiments, the data may be sent after verification of the digital signature provided by plug-in 365. In some embodiments, the higher resolution map data may be encrypted prior to transmission. In one embodiment, upon receiving the higher resolution map data, plug-in 365 may decrypt and process the VML data, generate high resolution PDL data, and send the data to printer 170-2. In another embodiment, plug-in 365 may simply pass the high resolution data to printer 170-2 and printer 170-2 may process the data prior to printing. If printer 170 is a network accessible printer, then the data may be sent to printer 170 over network 140. In some embodiments, such as shown in FIG. 3, where printer 170-2 is accessible through computer 110, plug-in 365 may send the data to printer 170-2 using computer 110. Printer 170-2 may use the data to print a high resolution map.

As noted above, in general, plug-in 365 may request alternate data associated with a URL wherein the alternate data is better suited to optimally use the capabilities of printer 170-2 when printed. For example, plug-in 365 may request data for a CMYK image that corresponds to a displayed RGB image, which has been selected for printing. The CMYK image data received from the application server may be sent to printer 170-2 for printing. As described above, the upstream request from plug-in 365 to server 130 can specify the particular map view desired, and include distinguishing flags to indicate the nature of the request to server 130—such as a request for CMYK data.

As a further example, when browser 360 displays a web-page, data sent to browser 360 may use fonts supported by browser 360. When the user requests printing of displayed content for the web page, plug-in 365 may request alternate data from the web-page with fonts supported by printer 170-1 or 170-2. The alternate data with fonts supported by printers 170 may be routed to the appropriate printer by plug-in 365 for printing.

In some embodiments, a program for conducting the processes described above can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170.

Note that although the description above uses plug-in 365 and/or printers 170 to describe possible implementations, alternate implementations are envisaged. For example, the method could be implemented directly by browser 360, where browser 360 is designed to support processing of the alternate data. Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A method, performed by a printer, for printing a web page served by a server and having a uniform resource locator (URL), comprising:

receiving, by the printer and from a client computer without routing the server, a print request to print the web page, the print request comprising the URL of the web page and a first version of displayed content on the web page, wherein the first version of displayed content comprises Printer Description Language (PDL) data, and wherein the web page is retrieved, before the print request is received by the printer, by a web browser of the client computer over a first network connection from the server serving the web page without routing the printer;

sending, by the printer and based on the URL in the print request, a request over a second network connection to the server serving the web page without routing the client computer for a second version of the displayed content in response to receiving the print request, wherein the first network connection and the second network connection are separate, and wherein the printer is external to the client computer and external to the server;

if available, receiving, by the printer and from the server serving the web page without routing the client computer, the second version of the displayed content over the second network connection; and printing, by the printer, the web page with the second version of the displayed content if the second version is available, and printing the first version of the displayed content if the second version is not available.

2. The method of claim 1, wherein the printer is a trusted client of the server serving the web page.

3. The method of claim 1, wherein the second version of the displayed content received in response to the request is encrypted.

4. The method of claim 1, wherein the displayed content is a map, and wherein the first version of the displayed content is a low resolution version of the map and the second version of the displayed content is a higher resolution version of the map.

5. The method of claim 1, wherein the displayed content is an image, and wherein the first version of the displayed content is a red-green-blue (RGB) version of the image and the second version of the displayed content is a cyan-magenta-yellow-black (CMYK) version of the image.

6. The method of claim 1, wherein the displayed content is a text string, and wherein the first version of the displayed content is the text string in a font supported by the web browser, and wherein the second version of the displayed content is the text string in a font supported by the printer, wherein the font supported by the printer is different from the font supported by the browser.

7. The method of claim 1, wherein
    the displayed content is a map;
    the first version comprises non-VML, lower-resolution, raster-based data; and
    the second version comprises higher-resolution, VML data.

8. A non-transitory computer-readable medium that stores instructions, which when executed by a processor, causes a printer to perform a method for printing a web page served by a server and having a uniform resource locator (URL), comprising:

receiving, by the printer and from a client computer without routing the server, a print request to print the web page, the print request comprising the URL of the web page and a first version of displayed content on the web page, wherein the first version of displayed content comprises Printer Description Language (PDL) data, and wherein the web page is retrieved, before the print request is received by the printer, by a web browser of the client computer over a first network connection from the server serving the web page without routing the printer;

sending, by the printer and based on the URL in the print request, a request over a second network connection to the server serving the web page without routing the client computer for a second version of the displayed content in response to receiving the print request, wherein the first network connection and the second network connection are separate, and wherein the printer is external to the client computer and external to the server;

if available, receiving, by the printer and from the server serving the web page without routing the client computer, the second version of the displayed content over the second network connection; and printing, by the printer, the web page with the second version of the displayed content if the second version is available, and printing the first version of the displayed content if the second version is not available.

9. The computer readable medium of claim 8, wherein the printer is a trusted client of the server serving the web page.

10. The computer readable medium of claim 8, wherein the second version of the displayed content received in response to the request is encrypted.

11. The computer readable medium of claim 8, wherein the displayed content is a map, and wherein the first version of the displayed content is a low resolution version of the map and the second version of the displayed content is a higher resolution version of the map.

12. The computer readable medium of claim 8, wherein the displayed content is an image, and wherein the first version of the displayed content is a red-green (RGB) version of the image and the second version of the displayed content is a cyan-magenta-yellow-black (CMYK) version of the image.

13. The computer readable medium of claim 8, wherein the displayed content is a text string, and wherein the first version of the displayed content is the text string in a font supported by the web browser, and wherein the second version of the displayed content is the text string in a font supported by the printer, wherein the font supported by the printer is different from the font supported by the browser.

14. The computer-readable medium of claim 8, wherein
    the displayed content is a map;
    the first version comprises non-VML, lower-resolution, raster-based data; and
    the second version comprises higher-resolution VML data.

15. A computer-readable memory that stores instructions, which when executed by a processor, causes a printer to perform a method for printing web page served by a server and having a uniform resource locator (URL), comprising:

receiving, by the printer and from a client computer without routing the server, a print request to print the web page, the print request comprising the URL of the web page and a first version of displayed content on the web page, wherein the first version of displayed content comprises Printer Description Language (PDL) data, and wherein the web page is retrieved, before the print request is received by the printer, by a web browser of the client computer over a first network connection from the server serving the web page without routing the printer;

sending, by the printer and based on the URL in the print request, a request over a second network connection to the server serving the web page without routing the client computer for a second version of the displayed content in response to receiving the print request, wherein the first network connection and the second network connection are separate, and wherein the printer is external to the client computer and external to the server;

if available, receiving, by the printer and from the server serving the web page without routing the client computer, the second version of the displayed content over the second network connection; and printing, by the printer, the web page with the second version of the displayed content if the second version is available, and printing the first version of the displayed content if the second version is not available.

16. The computer-readable memory of claim 15, wherein the displayed content is a map, and wherein the first version of the displayed content is a low resolution version of the map and the second version of the displayed content is a higher resolution version of the map.

17. The computer-readable memory of claim 15, wherein the displayed content is an image, and wherein the first version of the displayed content is a red-green-blue (RGB) version of the image and the second version of the displayed content is a cyan-magenta-yellow-black (CMYK) version of the image.

18. The computer readable memory of claim 15, wherein the displayed content is a text string, and wherein the first version of the displayed content is the text string in a font supported by the web browser, and wherein the second version of the displayed content is the text string in a font supported by the printer, wherein the font supported by the printer is different from the font supported by the browser.

19. The computer-readable memory of claim 15, wherein
the displayed content is a map;
the first version comprises non-VML, lower-resolution, raster-based data; and
the second version comprises higher-resolution, VML data.

* * * * *